(12) United States Patent
Breneman

(10) Patent No.: US 10,774,739 B2
(45) Date of Patent: Sep. 15, 2020

(54) METHOD AND SYSTEM FOR DETECTING MISALIGNMENT OF A FRONT END ACCESSORY DRIVE BELT

(71) Applicant: Ford Motor Company, Dearborn, MI (US)

(72) Inventor: Matthew Breneman, Canton, MI (US)

(73) Assignee: Ford Motor Company, Dearborn, MI (US)

(*) Notice: Subject to any disclaimer, the term of this patent is extended or adjusted under 35 U.S.C. 154(b) by 362 days.

(21) Appl. No.: 15/876,405

(22) Filed: Jan. 22, 2018

(65) Prior Publication Data
US 2019/0226397 A1 Jul. 25, 2019

(51) Int. Cl.
| F02B 77/08 | (2006.01) |
| F02B 67/06 | (2006.01) |
| G01M 13/023 | (2019.01) |
| G06T 7/90 | (2017.01) |
| G01L 1/24 | (2006.01) |

(52) U.S. Cl.
CPC ............ *F02B 77/081* (2013.01); *F02B 67/06* (2013.01); *G01L 1/24* (2013.01); *G01M 13/023* (2013.01); *G06T 7/90* (2017.01); *F02B 2275/06* (2013.01)

(58) Field of Classification Search
CPC ........... B62G 39/16; B65G 43/02; F16H 7/02; G03G 15/1615; G03G 2215/00143
USPC ......................................................... 474/102
See application file for complete search history.

(56) References Cited

U.S. PATENT DOCUMENTS

| 3,507,161 | A | * | 4/1970 | Hasenwinkle | ......... | B65G 39/16 |
| | | | | | | 474/102 |
| 4,527,686 | A | * | 7/1985 | Satoh | .................... | B65G 39/16 |
| | | | | | | 198/807 |
| 5,321,434 | A | * | 6/1994 | Strauch | ................... | B41J 2/473 |
| | | | | | | 347/116 |
| 5,394,222 | A | * | 2/1995 | Genovese | ............. | B65G 39/16 |
| | | | | | | 198/806 |
| 5,518,457 | A | * | 5/1996 | Seki | ..................... | B31F 1/2831 |
| | | | | | | 474/102 |
| 5,889,545 | A | * | 3/1999 | Rauch | ................... | H04N 1/506 |
| | | | | | | 347/118 |
| 6,137,517 | A | * | 10/2000 | Furst | ..................... | H04N 1/053 |
| | | | | | | 347/116 |
| 6,519,866 | B1 | * | 2/2003 | Gerdes | ................... | G01B 11/16 |
| | | | | | | 33/645 |
| 7,379,683 | B2 | * | 5/2008 | Kamiya | ............ | G03G 15/5008 |
| | | | | | | 399/301 |

(Continued)

FOREIGN PATENT DOCUMENTS

DE 102004060067 6/2006

*Primary Examiner* — Henry Y Liu
(74) *Attorney, Agent, or Firm* — Burris Law, PLLC

(57) ABSTRACT

The present discloser is directed toward a method for detecting misalignment of a belt for a front end accessory drive system. The method includes acquiring, by a plurality of optical sensors, multiple images of the belt arranged on a series of pulleys of the drive system. The belt includes a contrast element that is detectable by the optical sensors system and is visually distinct from a color of the belt. The method further includes analyzing, by way of a controller, data indicative of the acquired images to determine whether the contrast element is present in the captured images, and identifying the belt as being misaligned in response to the contrast element being in at least one of the acquired images.

20 Claims, 6 Drawing Sheets

(56) References Cited

U.S. PATENT DOCUMENTS

| | | | | |
|---|---|---|---|---|
| 7,905,346 B2* | 3/2011 | Enomoto | ............... | B41J 11/007 |
| | | | | 198/807 |
| 8,527,142 B2* | 9/2013 | Bacon | ................ | F16H 7/02 |
| | | | | 701/36 |
| 9,240,115 B2* | 1/2016 | Omura | ................. | G01M 13/023 |
| 9,506,825 B1* | 11/2016 | Rembisz | ............. | G01M 13/023 |
| 9,611,101 B1* | 4/2017 | Wolfe | .................... | B65G 39/16 |
| 2005/0266947 A1* | 12/2005 | Miyata | ................... | B65G 39/16 |
| | | | | 474/148 |
| 2008/0001772 A1* | 1/2008 | Saito | ...................... | A63B 22/02 |
| | | | | 340/679 |
| 2008/0232825 A1* | 9/2008 | Komai | ............... | G03G 15/0131 |
| | | | | 399/9 |
| 2010/0303514 A1* | 12/2010 | Ishii | .................... | G03G 15/161 |
| | | | | 399/301 |
| 2012/0006215 A1* | 1/2012 | DeJong | ............. | G03G 15/1615 |
| | | | | 101/481 |
| 2013/0100503 A1* | 4/2013 | Beselt | .................... | H04N 1/053 |
| | | | | 358/474 |
| 2014/0255063 A1* | 9/2014 | Kiryu | ................ | G03G 15/1615 |
| | | | | 399/302 |
| 2015/0166264 A1* | 6/2015 | Ballou | .................. | B65G 15/64 |
| | | | | 198/806 |
| 2016/0362253 A1* | 12/2016 | Wheat | .................... | B65G 43/02 |
| 2019/0137350 A1* | 5/2019 | Guru | .................. | G01M 13/028 |

* cited by examiner

METHOD AND SYSTEM FOR DETECTING MISALIGNMENT OF A FRONT END ACCESSORY DRIVE BELT

FIELD

The present disclosure relates to a method and system for detecting misalignment of a front end accessory drive belt.

BACKGROUND

The statements in this section merely provide background information related to the present disclosure and may not constitute prior art.

A front end (i.e., engine) accessory drive (FEAD) system includes a belt (e.g., serpentine belt) that is used to drive components like alternators, water pumps, A/C compressors from a crankshaft pulley. During manufacturing of the FEAD system, the belt is typically installed manually, and visually inspected by an operator for misalignment.

Minor misalignments may be difficult to detect with the manual inspection. In particular, if the belt is misaligned such that it rubs against a case of the FEAD system or hangs over a rim of a pulley, the belt may generate noise during vehicle operation and/or begin to wear more quickly. These and other issues are addressed by the present disclosure.

SUMMARY

This section provides a general summary of the disclosure, and is not a comprehensive disclosure of its full scope or all of its features.

In one form, the present discloser is directed toward a method for detecting misalignment of a belt for a front end accessory drive system. The method includes acquiring, by a plurality of optical sensors, multiple images of the belt arranged on a series of pulleys of the drive system. The optical sensors are disposed external of the drive system, and the belt includes a contrast element that is detectable by the optical sensors system and is visually distinct from a color of the belt. The method further includes analyzing, by way of a controller, data indicative of the acquired images to determine whether the contrast element is present in the captured images, and identifying the belt as being misaligned in response to the contrast element being in at least one of the acquired images.

In another form, the optical sensors are digital cameras, and the digital cameras are arranged to capture images of different viewpoints of the belt at one or more of the pulleys of the drive system.

In yet another form, the contrast element is a color feature that is detectable by the optical sensors and is disposed within or on the belt.

In one form, the acquiring the multiple images further comprises having a first optical sensor acquire a first image of a first pulley among the series of pulleys with the belt arranged on the first pulley to assess misalignment of the belt with respect to the first pulley, wherein the first camera is positioned to capture an image of a rim of the first pulley and a first surface of the belt.

In another form, the analyzing the acquired images further comprises determining whether the contrast element is present in the first image, wherein the contrast element is disposed within the belt and is detectable by the first camera when the belt is positioned on the rim.

In one form, the method further includes having the drive system in a stationary state.

In another form, the method further includes estimating a strain level of the belt in response to determining that the contrast element is present in the acquired image. The contrast element is a color feature that varies based on the amount of strain applied to the belt due to the misalignment, and the estimation of the strain level is based on a color of the contrast element and pre-stored data correlating different colors to predefined strain levels.

In yet another form, the identifying the belt as being misaligned further includes determining the belt is misaligned when the amount of strain is greater than or equal to a strain threshold.

In one form, the acquiring the multiple images further includes having a first camera of the image sensor system acquire a first image of a front face of a first pulley to assess misalignment of the belt with respect to a seat of the first pulley upon which the belt is positioned.

In another form, the analyzing the acquired images further includes determining whether the contrast element is present along an edge of the belt. The contrast element is provided along an edge of the belt and is detectable by the first camera when the belt is positioned offset from the seat of the first pulley and is undetectable when the belt is aligned with the seat of the first pulley.

In yet another form, the method further includes installing the belt on the drive system for a vehicle.

In one form, the method further includes generating and outputting a notification in response to the belt being misaligned.

In one form, the present discloser is directed toward an alignment detection system for detecting misalignment of a belt installed on a front end accessory drive (FEAD) system. The alignment detection system includes a plurality of digital cameras and a controller. The digital cameras are arranged to capture images of the belt arranged on multiple pulleys of the FEAD system. The digital cameras are configured to detect a contrast element on the belt, and the contrast element is visible to the digital cameras and is visually distinct from the belt. The controller is configured to process data indicative of the images captured to determine whether the belt is misaligned on the FEAD system. The controller determines that the belt is misaligned in response to the contrast element being captured in one or more of the images, and the belt is determined as being aligned in response to the contrast element being absent in the images captured.

In another form, one or more digital cameras from among the plurality of digital cameras are arranged to capture images of a front face of one or more pulleys among the multiple pulleys of the FEAD system to detect misalignment of the belt with respect to the one or more pulleys. The controller is configured to determine that the belt is misaligned in response to the contrast element being detected along an edge of the belt in at least one image captured by the one or more digital cameras.

In yet another form, one or more digital cameras from among the plurality of digital cameras are arranged to capture images of a rim of one or more pulleys among the multiple pulleys and a first surface of the belt arranged on the one or more pulleys. The first surface is opposite to a second surface of the belt, where the second surface is in contact with a surface of a respective pulley of the one or more pulleys.

In one form, the controller is configured to determine that the belt is misaligned in response to the contrast element being detected at the first surface of the belt in at least one image captured by the one or more digital cameras.

In another form, the digital cameras are arranged to capture images of a planar side of the belt at one or more pulleys among the multiple pulleys. The belt has a ribbed side opposite the planar side, and the ribbed side is in contact with the one or more pulleys.

In one form, the present disclosure is directed toward a belt misalignment detection method for a vehicle. The method includes: capturing, by multiple digital cameras, images of the belt arranged on multiple pulleys of an accessory drive system, where the belt includes a contrast element visible by the cameras; analyzing data indicative of the images to determine whether the contrast element is present in the captured images; and identifying the belt as misaligned when the contrast element is detected in at least one of the images.

In another form, the method further includes arranging one or more of the multiple digital cameras to capture images of a planar side of the belt at one or more pulleys among the multiple pulleys. The belt has a ribbed side opposite the planar side, and the ribbed side is in contact with the one or more pulleys.

In yet another form, the contrast element is a color feature that is detectable by the digital cameras and is disposed within or on the belt.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
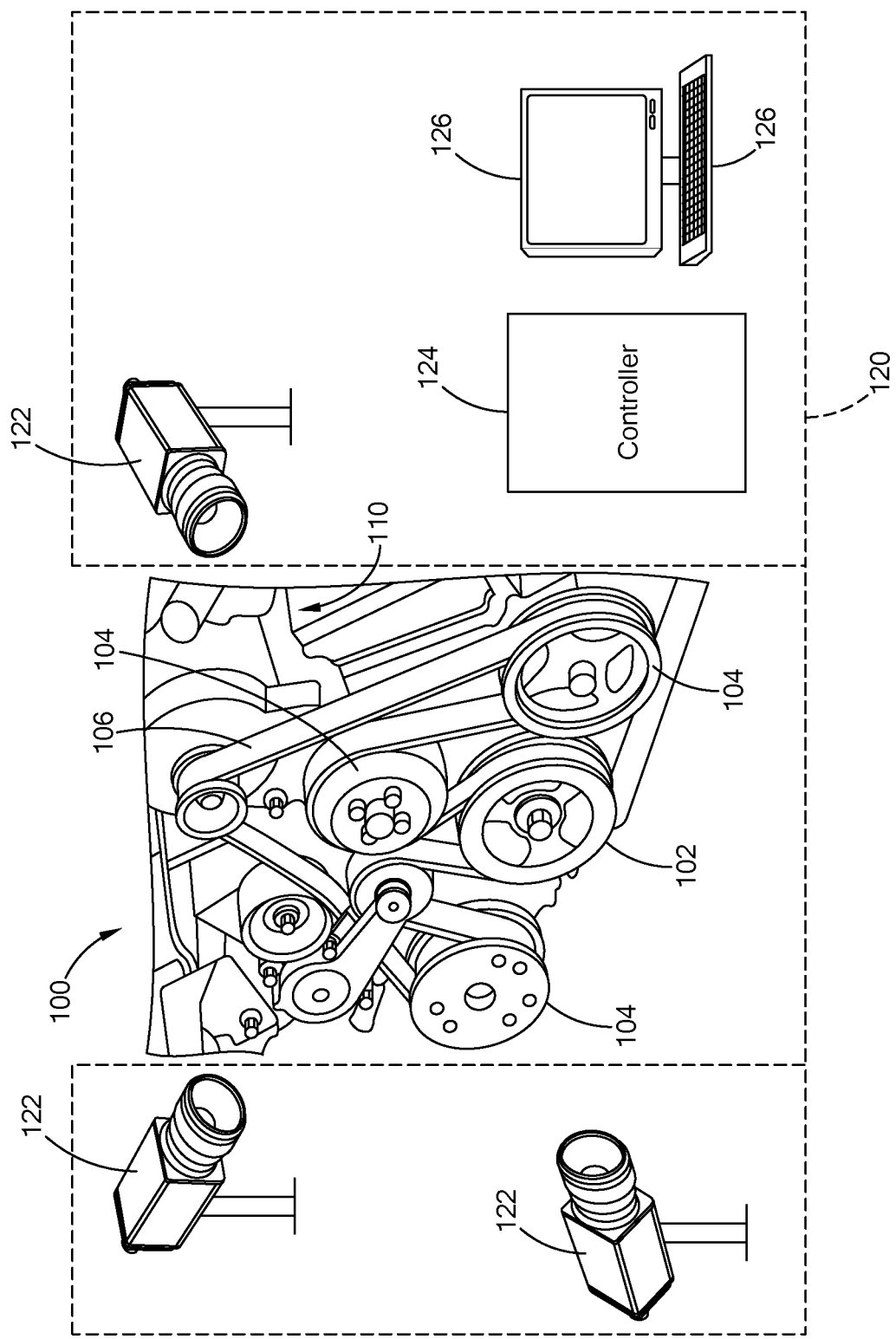
FIG. 1 illustrates an alignment detection system for detecting alignment of a belt installed on a FEAD system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a front end accessory drive (FEAD) system 100 powers multiple accessory components within a vehicle, such as an alternator, an A/C compressor, a power steering pump, and a water pump. In one form, the FEAD system 100 includes a drive pulley 102 (i.e., a crankshaft/drive damper), multiple accessory pulleys 104, and a belt 106 (i.e., a serpentine belt) wrapped about the drive pulley 102 and the accessory pulleys 104. Generally, in operation, the drive pulley 102 drives the belt 106 which in return drives the accessory pulleys 104 to provide power to the accessory components.

Figure 2:
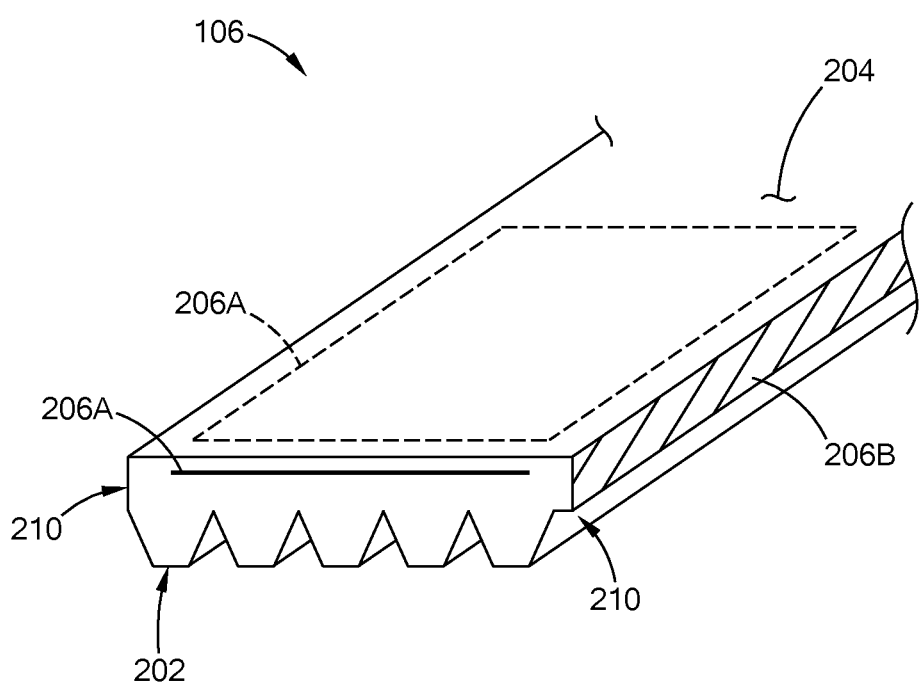
FIG. 2 is partial cross-sectional view of the belt in accordance with the teachings of the present disclosure.

Referring to FIG. 2, the drive belt 106 includes a ribbed side 202 for, and a planar (smooth) side 204. The belt 106 is generally made of rubber, such as ethylene propylene diene monomer and (EPDM) or neoprene, and may include two more layers around. For example, in one form, the belt 106 includes fibers (not shown) on one or both sides of the belt 106 and a layer of rubber is molded over the fibers.

With continuing reference to FIG. 1, the drive pulley 102 and the accessory pulleys 104 may be collectively referred to as pulleys 102 and 104. The pulleys 102 and 104 define a seat 108 upon which the belt 106 rides along. Some of the pulleys 102 and 104 may have seats 108 that is smooth and others may have seats 108 with ridges that engage with the ribs of the ribbed side 202 of the belt 106. During installation, the belt 106 may be misaligned with a pulley such that the ribbed side 202 of the belt 106 is offset from the seat of the pulley. For example, if the pulley has a flanged rim, the belt 106 may be positioned such that a rib of the belt 106 is positioned on the flanged rim of the pulley instead of resting on the seat of the pulley. In another example, the belt 106 is misaligned when the ribbed side 202 of the belt 106 is offset from the ridges provided on the seat of the pulley causing the belt 106 to hang over a front face of the pulley or sit far behind to ride up a surface of a case 110 of the FEAD system 100.

To detect such misalignment, an alignment detection system 120 is configured to determine whether the belt 106 is misaligned. The alignment detection system 120 may be implemented as part of the manufacturing process of the FEAD system 100 or may be provided at a service dealership that performs maintenance on the FEAD system 100. In one form, the alignment detection system 120 includes one or more optical sensors 122, such as digital cameras, a controller 124, and one or more user interfaces 126. The optical sensors 122 are arranged to capture multiple images of the belt 106 arranged on the pulleys 102 and 104 of the FEAD system 100. In one form, the optical sensors 122 are attached to one or more fixtures arranged external of the FEAD system 100 and have adjustable orientation and focus points.

In one form, the controller 124 is a computer having a processor, memory (e.g., RAM and/or ROM) that stores computer readable instructions executable by the processor. The controller 124 is communicably coupled to the optical sensors 122 and the user interfaces 126 by way of wired and/or wireless communication link to acquire data indicative of the images captured by the optical sensors 122 and communicate with an operator, respectively. The controller 124 is configured to analyze the data to determine if the belt 106 is misaligned in accordance with the teachings of the present disclosure.

More particularly, referring to FIG. 2, the drive belt 106 further includes contrast elements 206A and 206B, which are collectively referred to as contrast element 206. The contrast element 206 is visible by the optical sensor 122 and is of a different color than that of the belt 106. The contrast element 206A is provided within the belt 106, such that a layer of the contrast element 206A is provided just below a surface of the rubber material. The contrast element 206A may be disposed in various suitable ways within the belt

106. For example, the contrast element 206A may extend the entire length of the belt 106 as on element 206A. Alternatively, the belt 106 includes multiple contrast elements 206A that are distributed along the length of the belt 106 in a segmented manner. In addition, the contrast element 206A is provided proximate to at least one of the ribbed side 202 or the planar side 204. That is, the contrast element 206 is arranged close to an exterior surface of at least one of the ribbed side 202 or the planar side 204.

The contrast element 206B is provided along one or both edges 210 of the belt 106. In one form, the contrast element 206B is disposed directly on the surface of the edge 210. For example, a fluid (e.g., liquid paint, or powder) is applied to the edge 210 to form the contrast element 206B. The contrast element 206B may extend the entire length of the belt 106, or may be distributed along the length in a segmented manner, such that the belt 106 includes multiple contrast elements 206B.

While the belt 106 is illustrated as having both contrast elements 206A and 206B, the belt 106 may include one of contrast elements 206A or 206B. In addition, in one form, the contrast element 206 is provided as one color different from that of the belt 106. In another form, the contrast element 206 may have varying colors based on the level of strain exerted on the belt 106. For example, the contrast element 206 may include multiple layers of different colors, where each color is visible when the belt 106 undergoes a specific level of strain associated with the color.

Figure 3B:
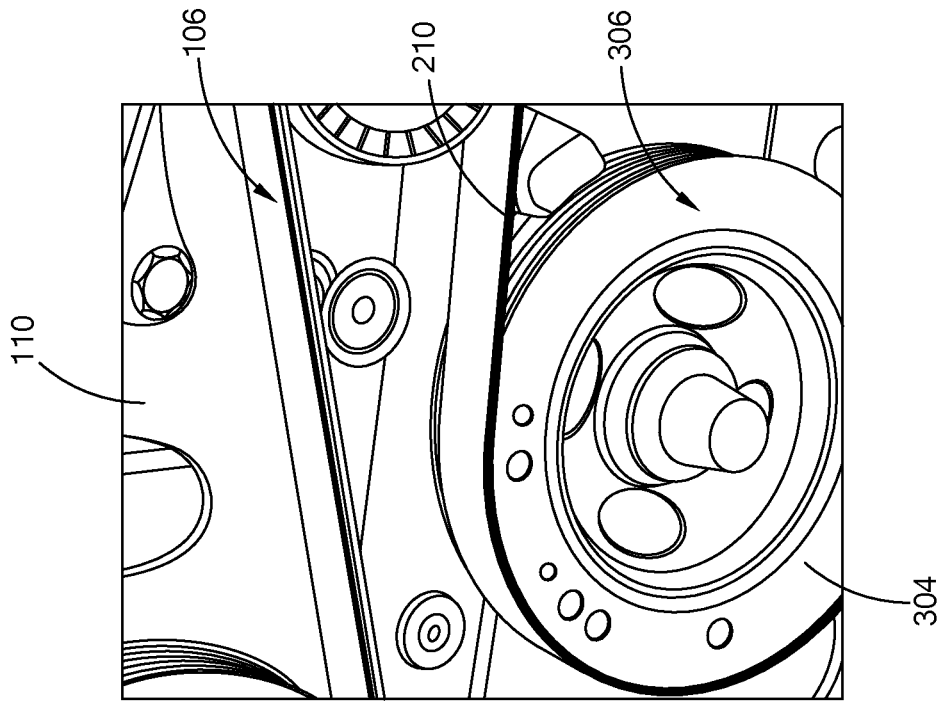
FIGS. 3A and 3B illustrate an aligned state and a misaligned state of the belt in a first example, in accordance with the teachings of the present disclosure, respectively.
Figure 3A:
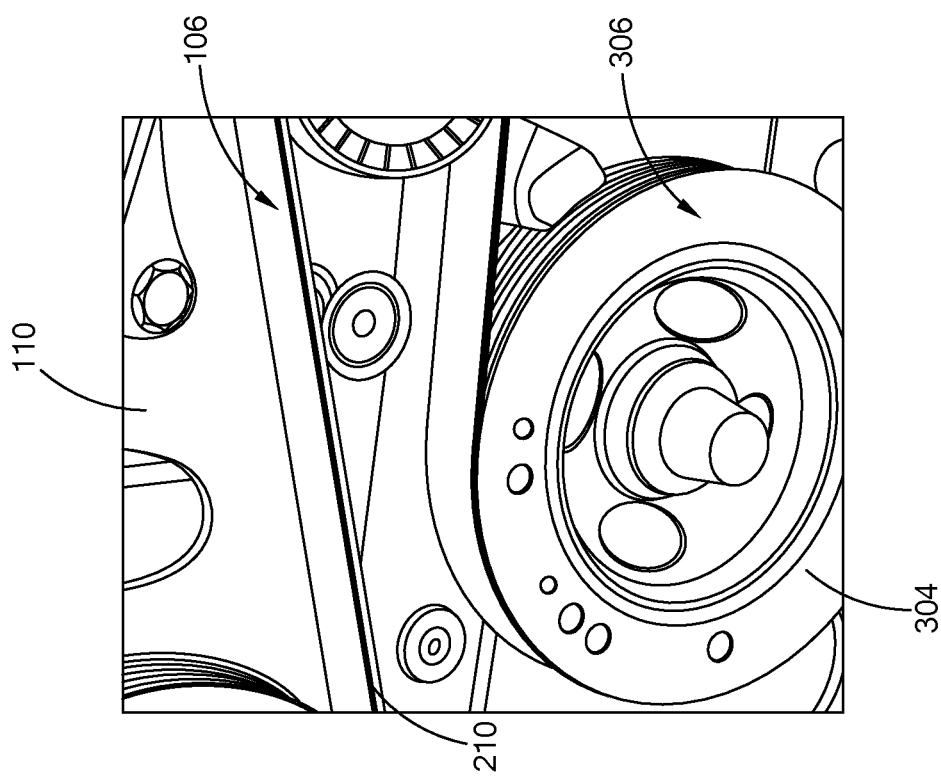

The alignment detection system 120 determines whether the belt 106 is misaligned based on the visibility of the contrast element 206 by the optical sensors 122. More particularly, the optical sensors 122 are arranged to capture different viewpoints of the belt 106 arranged at one or more of the pulleys 102 and 104 such that at the particular viewpoint the contrast element 206 is not visible if the belt 106 is aligned with the pulley, and is visible when the belt 106 is misaligned. For example, referring to FIGS. 3A and 3B, an optical sensor is arranged to capture an image of a front face 304 of a pulley 306. The pulley 306 can be any one of the pulleys 102 and 104. The optical sensor is angled to detect the position of the belt 106 relative to the front face 304 and a surface of the case 110. For instance, when the belt 106 is aligned correctly, the belt 106 is positioned within a seat defined by the pulley 304 such that the edges 210 of the belt 106 are behind the front face 304 and not in contact with the case 110, as illustrated in FIG. 3A. Accordingly, the contrast element 206B disposed on the edge 210 is not visible and the belt 106 is not strained by the pulley 306 to expose the contrast element 206A disposed within the belt 106. Conversely, when the belt 106 is misaligned, the belt 106 may overlap with an edge/rim of the pulley 306 to hang over the front face 302 exposing the edge 210 of the belt 106, as illustrated in FIG. 3B. Alternatively, the belt 106 may be positioned to close to the case 110 such that the belt 106 overlaps with the case 110 exposing the edge 210 closest to the case 110. Accordingly, the optical sensor at least detects the contrast element 206B provided about the edge 210 when the belt 106 is misaligned.

Figure 4B:
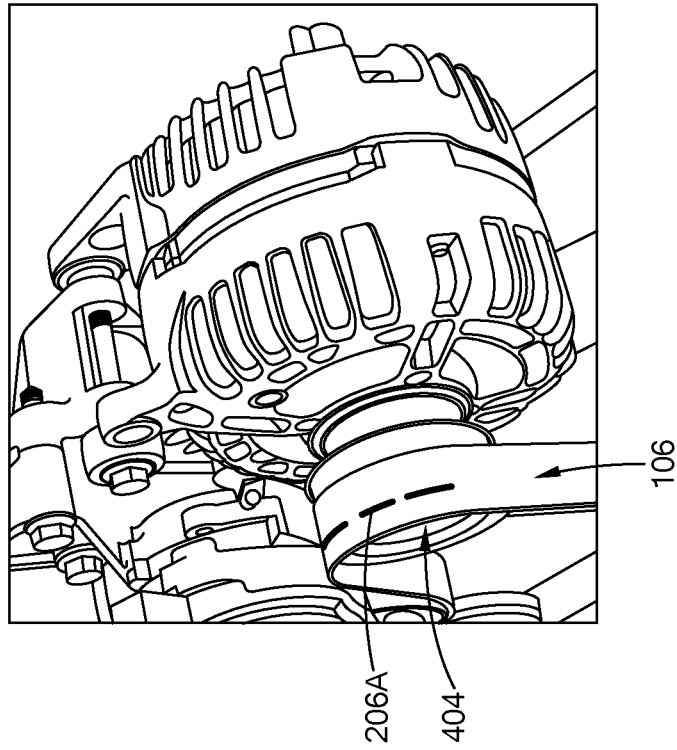
FIGS. 4A and 4B illustrate an aligned state and a misaligned state of the belt in a second example, in accordance with the teachings of the present disclosure, respectively.
Figure 4A:
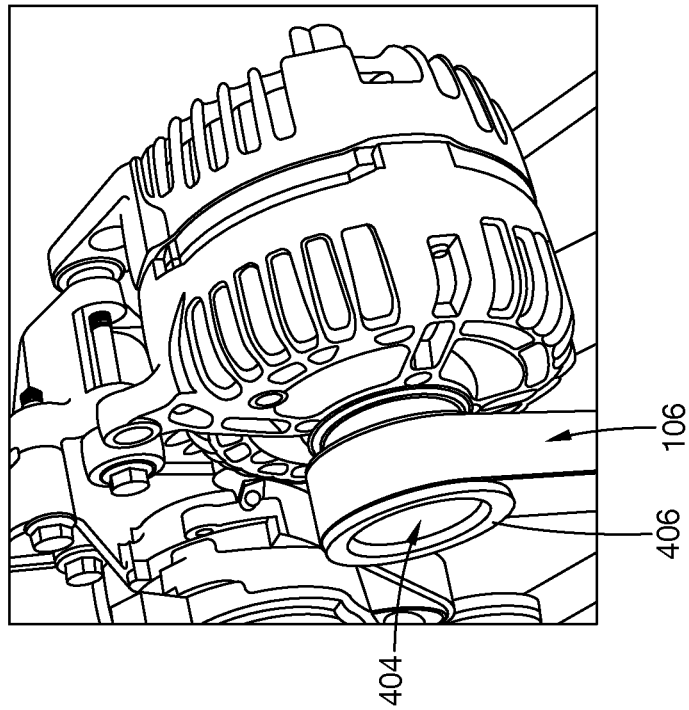

Referring to FIGS. 4A and 4B, in another example, an optical sensor is arranged to capture an image of a pulley 404 at an angle that is perpendicular to a front face of the pulley 404 (e.g., top view, bottom view). The pulley 404 can be any one of the pulleys 102 and 104. The optical sensor is angled to detect a surface of the belt 106 and a position of the belt 106 relative to a seat or more particularly, a rim 406 of the pulley 404. For instance, when the belt 106 is aligned correctly, the belt 106 is positioned within the seat of the pulley 404 such that the belt 106 is positioned behind the rim 406. Accordingly, the belt 106 is not strained by the rim 406 to expose the contrast element 206A disposed within the belt 106. Conversely, when the belt 106 is misaligned, as illustrated in FIG. 4B, the belt 106 may overlap with the rim 406 of the pulley 404 such that the belt 102 is strained by the rim 404. The strain exposes the contrast element 206A disposed within the belt 106, and accordingly, is detectable by the optical sensor 402.

Other arrangements of the optical sensors for detecting misalignment of the belt 106 with one or more of the pulleys 102 and 104 are also within the scope of the present disclosure, and should not be limited to the examples provided herein. Specifically, based on the position of the belt 106 at the various pulleys and potential misalignment, the optical sensors may be arranged in multiple ways to capture different viewpoints. For example, multiple cameras may be used to capture different angles of the belt 106 arranged on a single pulley or a single camera may be used to capture the belt 106 arranged on multiple pulleys.

Once the images are captured, the controller 124 analyzes the images to determine if the contrast element 206 is present in one or more of the images. In one form, the controller 124 is configured to use known image processing techniques that analyzes the data from the optical sensors 122 to determine whether the contrast element 206 is provided in any of the images captured. More particularly, since the contrast element 206 is provided as a different color than that of the belt 102, the pixel value data of the contrast element 206 is different from that of the color of the belt 106, and thus, is distinguishable by the controller 124.

Figure 5:
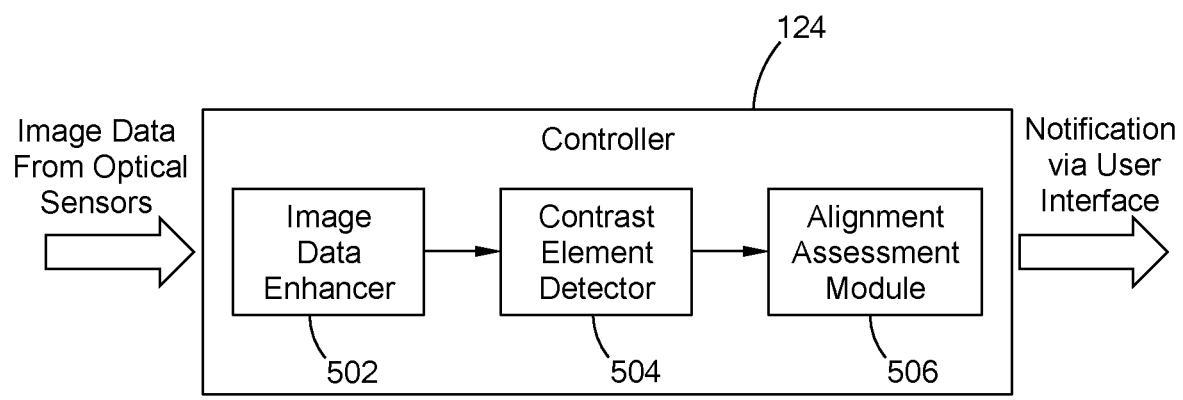
FIG. 5 is a functional block diagram of a controller of the alignment detection system of FIG. 1.

For example, in one form, FIG. 5 illustrates an example functional block diagram of the controller 124 in which the controller 124 includes an image data enhancer 502, a contrast element detector 504, and an alignment assessment module 506. The image data enhancer 502 performs one or more enhancement processes to the acquired image data to, for example, remove noise, enhance pixel-to-pixel contrast to detect relevant information, and/or to scale the data. An enhanced image data is then provided to the contrast element detector 504

The contrast element detector 504 analyzes the enhanced image data to determine whether the images depict the contrast element 206. For example, in one form, the contrast element detector 504 compares the data received to a pixel value or a range of pixel values associated with the color of the contrast element 206. If one or more image data falls within the range, the contrast element detector 504 determines that the contrast element 206 is present in one or more of the images captured. If none of the data falls within the range, the contrast element detector 504 determines that the contrast element 206 is not present in the images. Other methods for enhancing, and detecting the contrast element 206 may also be implemented, such as pattern recognition, and are also within the scope of the present disclosure.

Based on the output from the contrast element detector 504, the alignment assessment module 506 determines whether the belt 106 is misaligned and outputs a notification. In particular, if the contrast element 206 is present, the alignment assessment module 506 determines that the belt 106 is misaligned and outputs a notification that the belt 106 is misaligned via the user interface 126. Based on the misalignment, an operator may reinstall the belt or install a new belt onto the FEAD system. Once installed, the FEAD system 100 is inspected again for any possible misalignment of the belt in accordance with the teaching of the present disclosure. Accordingly, once detected, the misalignment can be addressed at the time of manufacturing.

Conversely, if the contrast element 206 is not detected, the alignment assessment module 506 determines that the belt 106 is aligned, and outputs a notification that the belt 106 is aligned or alternatively, does not output a notification. The alignment assessment module 506 may also store the result of the determination in a memory of the controller 124 as part of a part history of the FEAD system being assembled.

In one form, if the contrast element 206 is configured to project different colors based on the strain applied to the belt 106, the controller 124 may be configured to estimate a strain level of the belt 106. For example, the controller may include pre-stored data the correlates the different colors of the contrast element 206 to predefined strain levels. The controller 124 is configured to determine the color of the contrast element 206 and then the strain level based on the pre-stored information. In addition, the controller 124 may be configured to identify the belt 106 as being misaligned when the strain indicated by the color of the contrast element 206 is greater than or equal to a specific threshold. That is, if the contrast element is visible, the controller 124 identifies the belt 102 as being misaligned when the strain level is above, for example, 10% or some other suitable value.

Figure 6:
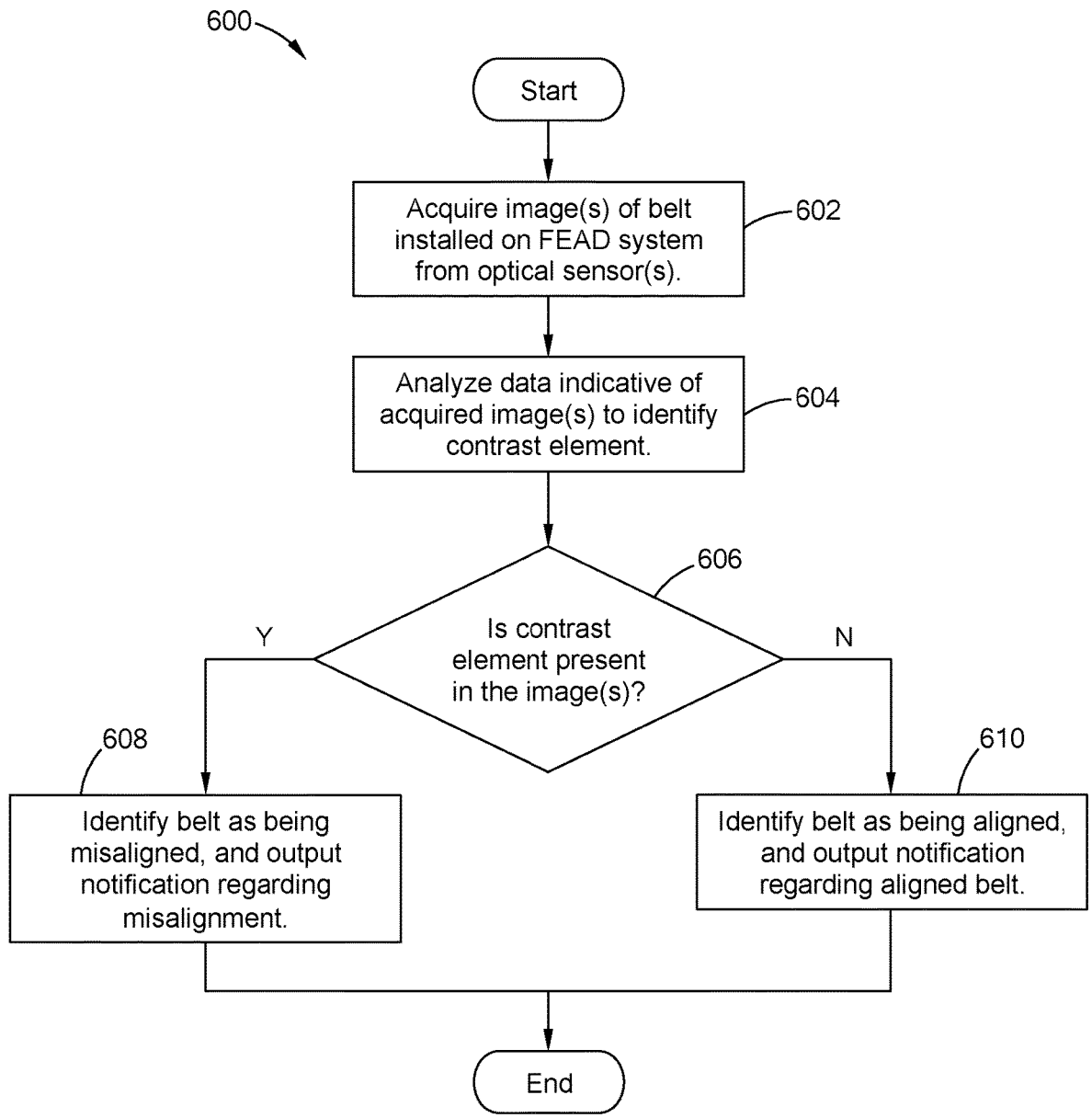
FIG. 6 is an example belt alignment detection routine performed by the alignment detection system in accordance with the teachings of the present disclosure.

Referring to FIG. 6, an example belt alignment detection routine 600 for a FEAD system is provided. The routine 600 is performed by the alignment detection system 120 of the present disclosure and begins when the belt 106 is installed on the FEAD system 100 and the system 100 being in a stationary state. At 602, the system acquires one or more images of the belt installed on the FEAD system from the optical sensors. At 604, the system, using suitable image processing techniques, analyzes data indicative of the images to extract or in other words, identify the contrast element in the images. At 606, the system determines whether the contrast element is preset in one or more images. If the contrast element is present, the system identifies the belt as being misaligned and outputs a misalignment notification, at 608. Once notified, an operator can address the misalignment by installing a new belt or reinstalling the misaligned belt before the FEAD system is transferred from the cell. If the contrast element is not present, the system identifies the belt as being aligned and outputs a normal notification, at 610. From here, the FEAD system may be transferred to the next cell of the manufacturing line. The notifications may include, for example, a message displayed on a monitor, an audio notification, a light indicator being turned on, such as red light for misaligned and green light for normal, or other suitable notification method.

The method and system of the present disclosure provides for an automated misalignment check of the belt installed on the FEAD system. For instance, a small misalignment, such as a 6-rib belt being installed 1 or 2 ribs out of place, is detectable due to the edge of the belt being positioned out of plane, and visible to an optical sensor. A larger misalignment in which the belt experience a strain due to a pulley exerting pressure on the belt may also be detectable by having the contrast element disposed within the belt. Once a belt is identified as being misaligned, measures can be taken to realign the belt at the time of installation.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for detecting misalignment of a belt for a front end accessory drive system, the method comprising:
    acquiring, by a plurality of optical sensors, multiple images of the belt arranged on a series of pulleys of the drive system, wherein the optical sensors are disposed external of the drive system, and the belt includes a contrast element that is detectable by the optical sensors and is visually distinct from a color of the belt;
    analyzing, by way of a controller, data indicative of the acquired images to determine whether the contrast element is present in the captured images; and
    identifying the belt as being misaligned in response to the contrast element being in at least one of the acquired images.

2. The method of claim 1, wherein the optical sensors are digital cameras, and the digital cameras are arranged to capture images of different viewpoints of the belt at one or more of the pulleys of the drive system.

3. The method of claim 1, wherein the contrast element is a color feature that is detectable by the optical sensors and is disposed within or on the belt.

4. The method of claim 1, wherein the acquiring the multiple images further comprises having a first optical sensor acquire a first image of a first pulley among the series of pulleys with the belt arranged on the first pulley to assess misalignment of the belt with respect to the first pulley, wherein the first camera is positioned to capture an image of a rim of the first pulley and a first surface of the belt.

5. The method of claim 4, wherein the analyzing the acquired images further comprises determining whether the contrast element is present in the first image, wherein the contrast element is disposed within the belt and is detectable by the first camera when the belt is positioned on the rim.

6. The method of claim 1 further comprising having the drive system in a stationary state.

7. The method of claim 1 further comprising estimating a strain level of the belt in response to determining that the contrast element is present in the acquired image, wherein the contrast element is a color feature that varies based on the amount of strain applied to the belt due to the misalignment, and the estimation of the strain level is based on a color of the contrast element and pre-stored data correlating different colors to predefined strain levels.

8. The method of claim 7, wherein the identifying the belt as being misaligned further comprises: determining the belt is misaligned when the amount of strain is greater than or equal to a strain threshold.

9. The method of claim 1, wherein the acquiring the multiple images further comprises having a first camera of the image sensor system acquire a first image of a front face of a first pulley to assess misalignment of the belt with respect to a seat of the first pulley upon which the belt is positioned.

10. The method of claim 9, wherein the analyzing the acquired images further comprises determining whether the contrast element is present along an edge of the belt wherein the contrast element is provided along an edge of the belt and is detectable by the first camera when the belt is positioned offset from the seat of the first pulley and is undetectable when the belt is aligned with the seat of the first pulley.

11. The method of claim 1 further comprising installing the belt on the drive system for a vehicle.

12. The method of claim 1 further comprising generating and outputting a notification in response to the belt being misaligned.

13. An alignment detection system for detecting misalignment of a belt installed on a front end accessory drive (FEAD) system, the alignment detection system comprising:
a plurality of digital cameras arranged to capture images of the belt arranged on multiple pulleys of the FEAD system, wherein the digital cameras are configured to detect a contrast element on the belt, the contrast element is visible to the digital cameras and is visually distinct from the belt; and
a controller configured to process data indicative of the images captured to determine whether the belt is misaligned on the FEAD system, wherein the controller determines that the belt is misaligned in response to the contrast element being captured in one or more of the images, and the belt is determined as being aligned in response to the contrast element being absent in the images captured.

14. The system of claim 13, wherein:
one or more digital cameras from among the plurality of digital cameras are arranged to capture images of a front face of one or more pulleys among the multiple pulleys of the FEAD system to detect misalignment of the belt with respect to the one or more pulleys, and
the controller is configured to determine that the belt is misaligned in response to the contrast element being detected along an edge of the belt in at least one image captured by the one or more digital cameras.

15. The system of claim 13, wherein one or more digital cameras from among the plurality of digital cameras are arranged to capture images of a rim of one or more pulleys among the multiple pulleys and a first surface of the belt arranged on the one or more pulleys, wherein the first surface is opposite to a second surface of the belt, and the second surface is in contact with a surface of a respective pulley of the one or more pulleys.

16. The system of claim 15, wherein the controller is configured to determine that the belt is misaligned in response to the contrast element being detected at the first surface of the belt in at least one image captured by the one or more digital cameras.

17. The system of claim 13, wherein the digital cameras are arranged to capture images of a planar side of the belt at one or more pulleys among the multiple pulleys, wherein the belt has a ribbed side opposite the planar side, and the ribbed side is in contact with the one or more pulleys.

18. A belt misalignment detection method for a vehicle comprising:
capturing, by multiple digital cameras, images of the belt arranged on multiple pulleys of an accessory drive system, wherein the belt includes a contrast element visible by the cameras;
analyzing data indicative of the images to determine whether the contrast element is present in the captured images; and
identifying the belt as misaligned when the contrast element is detected in at least one of the images.

19. The method of claim 18 further comprising arranging one or more of the multiple digital cameras to capture images of a planar side of the belt at one or more pulleys among the multiple pulleys, wherein the belt has a ribbed side opposite the planar side, and the ribbed side is in contact with the one or more pulleys.

20. The method of claim 18, wherein the contrast element is a color feature that is detectable by the digital cameras and is disposed within or on the belt.

* * * * *